United States Patent [19]

Kanbe et al.

[11] 4,034,119

[45] July 5, 1977

[54] METHOD AND APPARATUS FOR PREVENTING CAVE-IN OF BAKED GOODS

[75] Inventors: Takao Kanbe, Chofu; Yoshio Kaneko, Urawa; Satoshi Nomura, Tokyo, all of Japan

[73] Assignee: Nisshin Flour Milling Co., Ltd., Tokyo, Japan

[22] Filed: Jan. 27, 1976

[21] Appl. No.: 652,887

[52] U.S. Cl. .............................. 426/497; 99/355; 99/443 C; 426/523
[51] Int. Cl.² ................. A21D 15/00; A21C 15/00
[58] Field of Search .......... 426/496, 497, 466, 468, 426/523, 524; 99/355, 443 C

[56] References Cited

UNITED STATES PATENTS

| 1,910,620 | 5/1933 | Mabey | 426/497 X |
| 2,421,112 | 5/1947 | Brooks | 426/497 |
| 3,146,730 | 9/1964 | White | 426/496 X |
| 3,937,852 | 2/1976 | Wolf | 426/468 X |

*Primary Examiner* — S. Leon Bashore
*Assistant Examiner* — Marc L. Caroff

[57] ABSTRACT

Cave-in of the surface of a baked article is prevented by subjecting the baked article to an impact force when the interior temperature of the baked article is at most 5° C lower than what it was upon completion of baking; said impact force having a value equivalent to at least the impact force which would be applied to the article if it were to fall under gravity onto a rigid surface from a height of 3 centimeters.

10 Claims, 15 Drawing Figures

NO.1

NO.2

NO.3

NO.4

NO.5

NO.1

NO.2

NO.3

NO.4

NO.5

METHOD AND APPARATUS FOR PREVENTING CAVE-IN OF BAKED GOODS

The present invention relates to a process for the preparation of baked goods such as, for example, breads and cakes, and more particularly, to a method according to which such baked goods can be prepared without occurrence of the cave-in phenomenon and to an apparatus for practising this method.

In production of baked goods such as, for example, breads and cakes, there occurs an undesired phenomenon called "caving" or "cave-in"; namely, the surface of dough or batter caves in within a short time after being baked. This cave-in phenomenon results in not only reduction of the commercial value by degradation of the surface condition but also reduction of attractiveness and appetite-stimulating property. Further, in the case of fancy cakes, caving of the surface portion makes subsequent finishing treatments difficult.

Breads and cakes are generally prepared by baking dough or batter comprising wheat flour, egg, sugar, water and yeast or a chemical swelling agent. Air bubbles and water vapor contained in dough or batter and carbon dioxide gas generated from yeast or the swelling agent are expanded while included in the dough or batter by heating at the baking step, whereby the surface portion of the dough or batter is gradually raised. At this point, starch in the dough or batter is gelatinized, and egg and protein are coagulated, whereby the texture is formed. However, since the temperature of the interior of the baked good is lowered within a short period after the baking step and the gas pressure in the interior of the baked good is made much lower than the atmospheric pressure in the environment of the baked good, if air does not intrude into the baked good from the outside, the cave-in phenomenon is caused to occur and the texture is often destroyed. As the degree of rising of the dough or batter at the baking step becomes higher, this cave-in phenomenon will be conspicuous. In contrast, when dough or batter readily allowing gases to escape into the outside is employed, since air can readily intrude into the baked good on contraction after the baking step, the cave-in phenomenon hardly occurs.

In order to prevent occurrence of this cave-in phenomenon, various attempts have heretofore been made. For example, treatment of wheat flour as the main component of dough or batter has been properly changed, and a manufacturing apparatus is greatly modified, in such a manner that cooling is effected under reduced pressure or the baked dough is taken out of a baking oven by means of a suction system. However, none of these conventional attempts were satisfactory. More specifically, the change in treatment of the starting wheat flour resulted in increase of the manufacturing cost, and the modification of the manufacturing apparatus, for example, provision of an additional equipment, e.g., a vacuum pump for providing reduced pressure, was not desirable from the economical viewpoint.

It is therefore a primary object of this invention to provide a method and apparatus for preventing occurrence of the cave-in phenomenon skillfully in production of baked goods such as breads and cakes. It has been found that this object can be attained when a certain energy or force in the form of shock or vibration is applied to baked good under specific conditions detailed below just after the baking step.

In production of baked goods such as breads and cakes, especially the latter, it has heretofore been considered that in order to prevent occurrence of the cave-in phenomenon and other disadvantages, it was important to avoid any application of force such as shock or vibration to dough or batter throughout the manufacturing process. Accordingly, for attaining this purpose, various contrivances have been made to the manufacturing apparatus and deliberate cares have been required of workers. In contrast, according to the present invention, force is intentionally applied to the entire of baked good just after the baking step. Application of the force is conducted after the baked good has been taken out of a baking oven but while the interior temperature of the baked good is still maintained at a level lower by at most 5° C. than the temperature at completion of the baking step. Sufficient effects can be obtained when this force is larger than the shock to which the baked good is subjected when it is let to fall by gravity horizontally onto a fixed rigid, plain plate from a height of at least 3 cm while the dough is maintained in a baking pan. This minimum shock corresponds to a speed of about 0.77 m/sec just before the baked good impinges against the fixed plain plate. The force may be applied from the side face of the baking pan. Further, the force may be similarly applied by causing the baking pan to slide on a slope while containing the baked good therein and causing it to collide against the surface of a fixed rigid wall. In some cases, a force may be applied to dough or batter by natural falling or falling by gravity after it has been taken out of the baking pan or by other similar method. In any case, it is important that the force should be applied to the entire of baked good.

FIGS. 3 to 6 are comparative views showing the condition of cave-in on various cake, in which FIGS. 3(a), 4(a), 5(a) and 6(a) show cakes prepared by the conventional method and FIGS. 3(b), 4(b), 5(b) and 6(b) show cakes prepared by the method of the present invention. FIGS. 7(a) to 7(d) are views showing diagrammatically embodiments of the devices for applying a force according to the present invention.

Figure 8:
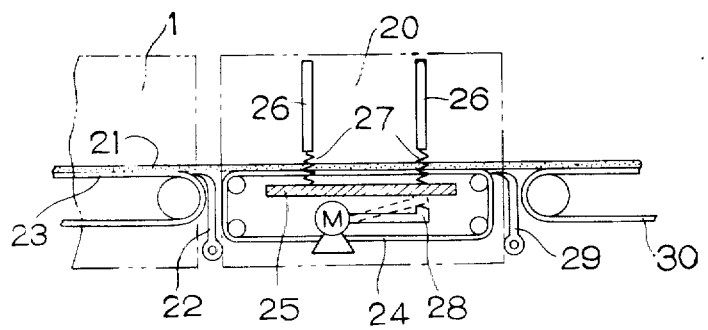

FIG. 8 is a view showing an embodiment of the apparatus of the present invention which is suitably used for production of roll cakes.

Results obtained when the method of the present invention was applied to production of cakes using cylindrical baking pans will now be described.

EXAMPLE 1 (SPONGE CAKE)

About 340 g of a cake batter consisting of 100 parts of wheat flour, 100 parts of egg, 100 parts of sugar and 40 parts of water was filled into five baking pans, and the batter was then baked at about 175° C. for about 30 minutes in a baking oven of rotary type. After baking, the baked good was taken out of the baking oven, and within 1 minute from the taking out of the baking oven, five baking pans were caused to naturally fall by gravity or slide down onto a hard or rigid horizontal plate, the falling distance being varied for the respective pans.

Figure 1:
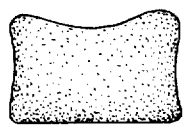
FIG. 1 is a view showing the condition of cave-in observed when baked cake is let to fall by gravity from various heights.
Figure 1:
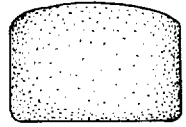
Figure 1:
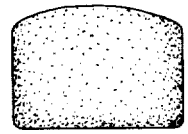
Figure 1:
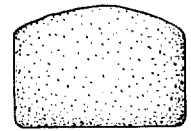
Figure 1:
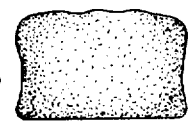

The condition of caving under consideration is illustrated in FIG. 1 and results are shown in Table I.

Table I

| Baking Pan No. | Falling Distance (cm) | Volume (cm³) | Condition of Caving |
|---|---|---|---|
| 1 | 0 | 1080 | large caving |
| 2 | 3 | 1230 | good appearance |
| 3 | 5 | 1250 | good appearance |
| 4 | 10 | 1300 | good appearance |
| 5 | slided along about 40 cm on slope of inclination angle of 40° | 1140 | slightly good appearance |

EXAMPLE 2 (SPONGE CAKE)

Figure 2:
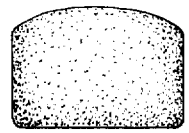
FIG. 2 is a view showing the condition of cave-in observed when a force is applied to baked cake at various temperatures.
Figure 2:
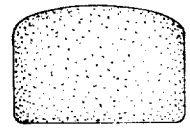
Figure 2:
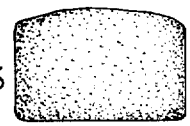
Figure 2:
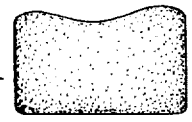
Figure 2:
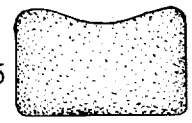

Batter was prepared and baked in the same manner as described in Example 1. The baking pans were taken out of the baking oven and they were let to fall naturally by gravity from a height of 3 cm onto a fixed rigid plain plate after a prescribed period of time indicated in Table II had passed after the pans were taken out of the baking oven together. The condition of the resulting caving is shown in FIG. 2. The results are shown in Table II. The interior temperature was measured at the center of the baked good or the cake.

Table II

| Baking Pan No. | Lapse of Time (sec) | Interior Temperature (°C.) of Baked Goods | Condition of Caving |
|---|---|---|---|
| 1 | 10 | 97 | good appearance |
| 2 | 30 | 96 | good appearance |
| 3 | 60 | 95 | slightly good appearance |
| 4 | 90 | 94 | small caving |
| 5 | 120 | 92 | large caving |

From the results of the foregoing Examples 1 and 2, it will readily be understood that good results are obtained when the energy or force is applied to baked good or cake while the interior temperature of the baked good is still maintained at a level lower by at most 5° C. than the temperature at the time of completion of the baking step, and that occurrence of the cave-in phenomenon can be prevented when the applied force is such that in the case of natural falling, the falling distance is at least 3 cm which corresponds to a falling speed of at least 0.77 m/sec and when the applied force is as large as mentioned above, even if caving is caused, it is very small and causes no substantial trouble. Time lapse shown in Example 2 are of illustrative purpose, and the lapse of time after taking out of the baking oven is changed appropriately depending on such factors as the volume of batter in used, the size of a baking pan and the temperature of the environment where the baked good is placed. Accordingly, when a force is applied to baked good taken out of a baking oven, the lapse of time is not a critical factor.

Results of experiments conducted under the above-mentioned conditions to examine influences of the composition of the batter on occurrence of the cave-in phenomenon will now be described.

EXAMPLE 3 (SPONGE CAKE)

Figure 3A:
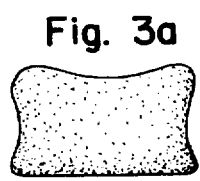
Figure 3B:
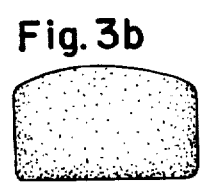

Batter consisting of 100 parts of wheat flour, 100 parts of egg, 100 parts of sugar and 40 parts of water was treated according to the conventional admixing and co-bubbling method and then baked. The baked good or cake was taken out of the baking oven while in the baking pan and was let to fall naturally by gravity from a height of 5 cm. Then, the baked good was cooled and the cave-in phenomenon was examined. For comparison, a sponge cake was similarly prepared according to the conventional method for preparing a sponge cake. Results are shown in FIG. 3. FIG. 3(a) illustrates the state of the sponge cake prepared according to the conventional method and FIG. 3(b) illustrates the state of the sponge cake prepared according to the method of the present invention.

EXAMPLE 4 (BUTTER SPONGE CAKE)

Figure 4A:
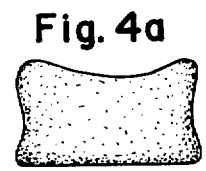
Figure 4B:
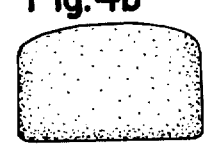

Batter consisting of 55 parts of wheat flour, 100 parts of egg, 85 parts of sugar, 5 parts of an emulsifier, 10 parts of syrup and 40 parts of batter was treated according to the conventional butter sponge method and then baked. The baking pan was taken out of the baking oven while containing the baked good and was let to fall by gravity from a height of 5 cm to a fixed rigid stand to thereby apply a force to the baked good. The baked good was cooled and the cave-in phenomenon was examined. For comparison, a butter sponge cake was prepared according to the conventional method. Results are shown in FIG. 4. FIG. 4(a) illustrates the state of the cake prepared according to the conventional method and FIG. 4(b) illustrates the state of the cake prepared according to the method of the present invention.

EXAMPLE 5 (NAGASAKI CASTELLA)

Figure 5A:
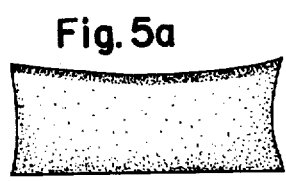
Figure 5B:
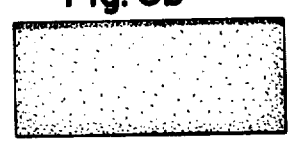

Castella batter consisting of 55 parts of wheat flour, 100 parts of egg, 100 parts of sugar, 20 parts of syrup and 10 parts of water was treated according to the conventional method and then baked. The baking pan was taken out of the baking oven and was let to fall by gravity from a height of 5 cm to a fixed rigid stand to thereby apply a force to the baked good. For comparison, a castella was similarly prepared according to the customary method. FIG. 5(a) illustrates the state of the cake prepared according to the conventional method and FIG. 5(b) illustrates the state of the cake prepared according to the method of the present invention. It is seen that the effect of preventing reduction of the height of the product rather than the effect of preventing occurrence of the cave-in phenomenon was attained according to the method of the present invention.

EXAMPLE 6 (CHIFFON CAKE)

Figure 6A:
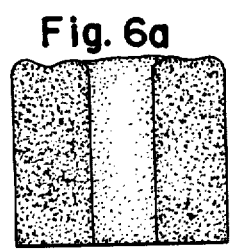
Figure 6B:
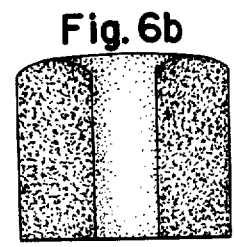

Cake batter consisting of 100 parts of wheat flour, 50 parts of salad oil, 50 parts of egg york, 100 parts of albumin, 135 parts of sugar, 1.5 parts of table salt, 1.0 part of cream of tartar, 3.0 parts of baking powder, 80 parts of water and a suitable amount of a perfume was treated according to the conventional method and then baked. The baking pan was taken out of the baking oven while containing the baked good and was then let to fall by gravity from a height of 5 cm to thereby apply a force or shock to the good. For comparison, a chiffon cake was similarly prepared according to the conventional method. Results are shown in FIG. 6 showing the section of the central part of the resulting cake. FIG. 6(a) shows the state of the chiffon cake prepared according to the conventional method and FIG. 6(b) shows the state of the chiffon cake prepared according to the method of the present invention.

In all of the foregoing Examples, cakes were prepared, but quite similar results were obtained when the method of the present invention was applied to production of breads. Breads are different from cakes in the point that, in production of breads, yeast is used for fermentation and expansion, while in production of cakes a chemical swelling agent or egg is employed. But they are quite similar to each other in the point that on expansion of dough at the baking step, air bubbles, water vapor, carbon dioxide gas and the like contained in the interior of the dough are not allowed to escape from the interior of the dough but raise the surface portion thereof and after cooling, the cave-in phenomenon is caused by reduction of the pressure caused in the interior of the baked good.

In production of either breads or cakes, dough or batter containing as the main ingredient wheat flour is baked and the interior temperature of the dough or batter at the baking step is about 98° C. Accordingly, in each case, a sufficient caving-preventing effect can be attained when a force is applied to the entire of the baked good after the latter has been taken out of the baking oven while the interior temperature of the baked good is still maintained at a level lower by at most 5° C. than the temperature at the time of completion of the baking step.

Various devices for applying energy or force such as shock or vibration to the baked dough or batter are diagrammatically illustrated in FIG. 7. These devices are preferably disposed just downstream of a baking oven in the line of production of a baked good such as, for example, breads or cakes. The reason is that it is important to apply a force to the baked good while the temperature of the baked good is still maintained at a level lower by at most 5° C. than the temperature just after the baking step.

In each of the devices shown in the drawings, there is adopted a system in which a force is applied to a baked good while it is in a baking pan. This system is roughly classified into three types; namely, (1) a system in which a baking pan is caused to naturally fall or slide by gravity and impinge against a fixed rigid stand or fixed rigid wall to thereby utilize a force by collision shock, (2) a system in which a baking pan is punched or struck from the outside, thereof, and (3) a system in which a baking pan is passed through an uneven passage that is a passage having convexities and concavities to thereby give vibrations to the baked good. Devices shown in FIGS. 7(a) and 7(b) adopt the system (1), the device shown in FIG. 7(c) adopts the system (2) and the device shown in FIG. 7(d) adopts the system (3).

Figure 7A:
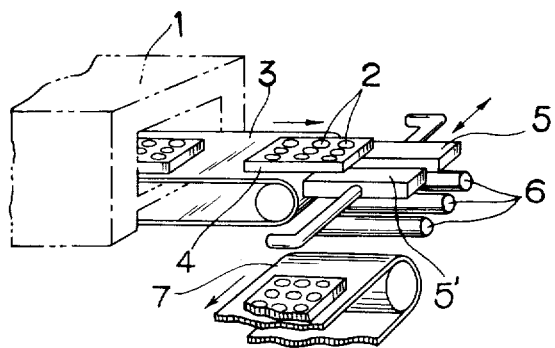

Referring now to FIG. 7(a), a baked good 2 or dough or batter baked in a baking oven 1 indicated by two-dot chain lines is continuously transported by a conveyor 3 while it is contained in a baking pan 4. When the baked good 2 arrives at the end of the conveyor 3, the opposite bottom edges of the baking pan 4 are once supported by a pair of supporting members 5 and 5' and then, upon opening of the supporting members 5 and 5' which move toward and away from each other as shown by an double arrow in FIG. 7(a), the baked good 2 being contained in the baking pan is let to fall naturally by gravity onto rigid rollers 6 made of a metal or the like and disposed below the supporting members, and a shock is imparted to the entire of the good. Then, the baking pan 4 is transported by another conveyor 7 to a subsequent step, for example, the station where the baked good is taken out of the baking pan 4. The frequency of opening of the supporting members 5 and 5' is adjusted synchronously with the moving speed of the baking pan 4, namely the speed of the conveyor 3.

Figure 7B:
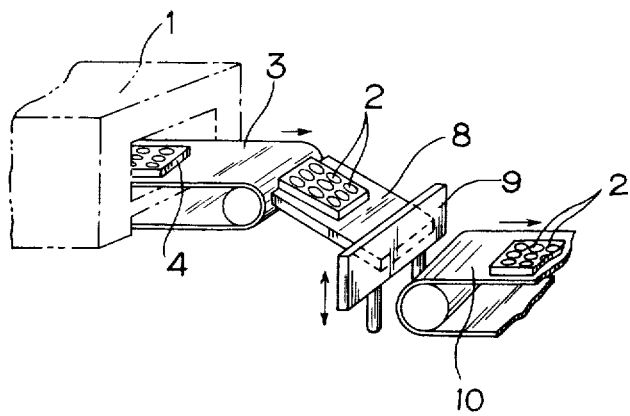

In the device shown in FIG. 7(b), the baking pan 4 is caused to slide on a slope 8 and impinge against a moving wall 9 vertically mounted adjacent the lower end of the slope, thereby to apply a shock to the baked good 2, and immediately thereafter, the moving wall 9 is retreated vertically downwardly and the baking pan 4 is transported to the next step by a conveyor 10. The moving wall 9 is disposed so that it can be moved vertically by suitable means and it impinges against the baking pan 4 at the uppermost position. After collision with the baking pan 4, the wall 9 is moved downwardly to transfer the pan 4 to the conveyor 10. The wall 9 may of course be moved upwards to allow the baking pan 4 to pass to the conveyor 10.

Figure 7C:
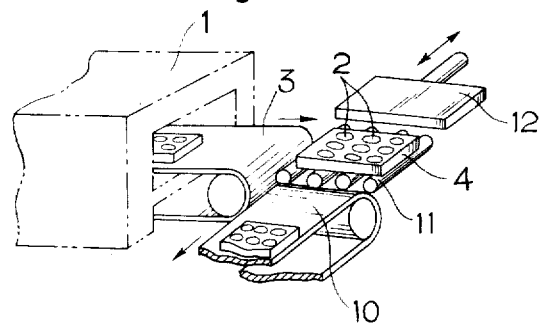

In the device shown in FIG. 7(c), the side wall of the baking pan 4 which has been transported from the baking oven 1 by the conveyor 3 is punched or subjected to a strike by a striker 12 on rollers 11 disposed adjacent to the end of the conveyor 3, thereby to impart a shock to the baked good. The operation of the striker 12 is repeated every time a baking pan 4 is placed on the rollers 11.

Figure 7D:
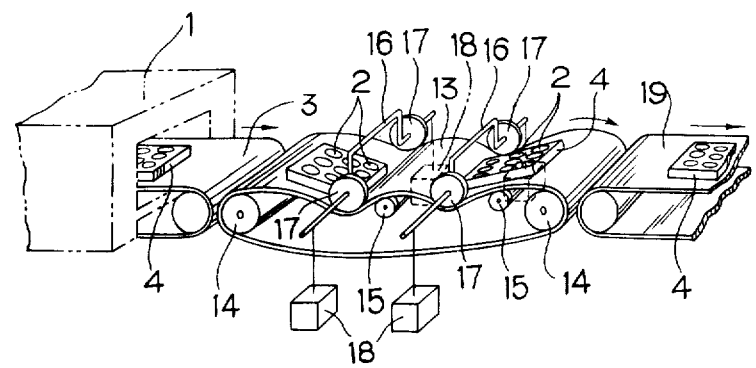

In the device shown in FIG. 7(d), the baking pan 4 transported by the conveyor 3 is transferred to a conveyor 13 disposed adjacently to the conveyor 3, and vibrations are given to the baked good being transported by the conveyor 13. The conveyor 13 is of such an arrangement that a pair of large diameter rollers 14, at least one of which is a driving roller, are disposed on both the ends of the conveyor 13, respectively. Between these rollers 14, 14, there are disposed a plurality of small diameter driving rollers (two rollers in FIG. 7(d) 15, 15. A pair of tension wheels 17, 17 coupled to each other by a crank rod 16 is arranged respectively between one of the large diameter rollers 14, 14 and one of the small diameter driving rollers 15, 15 and between the two small diameter driving rollers 15, 15. Tension is provided by the tension wheels 17, 17 with the aid of weights 18, 18 suspended at both ends of the crank rod 16. An endless belt is loosely provided passing through between the small diameter driving rollers 15, 15 and the tension wheels 17, 17. While the baking pan 4 is being transported by this conveyor 13, vibrations are given to the bottom of the baking pan 4 by these rollers 15, 15. As the transportation speed of the conveyor 13 becomes higher, vibration applied to the baking pan will be greater. After vibration has thus been imparted, the baking pan 4 is transferred to another conveyor 19 and transported to a next processing step.

In addition to the device shown in FIG. 7(d), as means for imparting vibration to the baking pan 4, there can be adopted a device in which a plurality of small diameter rollers are horizontally disposed between the two large diameter rollers 14 and central rotation axes of these small diameter rollers are eccentric from the central axes thereof to deviate rotation phases of these rollers from one another. In short, these small diameter rollers are of eccentric type. If these small diameter rollers are simultaneously driven, irregular vibrations are provided and given to the baking pan 4 from the bottom thereof while it is being transported on the belt.

In each of the foregoing devices, it is important that shocks or vibrations should be given to the baked good just after the baking pan is taken out of the baking oven, namely while the temperature of the baked good is still maintained at a level lower by at most 5° C. than the temperature at the time of completion of the baking step. If the temperature of the baked good is lower than the above level, no sufficient effect of preventing the cave-in phenomenon can be attained even if a force is applied to the baked good.

The force-applying method and the intensity of the force are decided depending upon the kind of materials to be baked, the condition of the production line and other factors. At any rate, it is important that the force should be applied to the entire of the baked good and the intensity of the force should be at least equal to the intensity of the force imposed on the baked good when the good is let to fall naturally by gravity from a height of at least 3 cm onto a fixed plain plate, while being contained in the baking pan, which corresponds to a falling speed of at least about 0.77 m/sec on natural falling.

The cave-in phenomenon, prevention of which is intended in the present invention, is readily caused also in roll cakes. Accordingly, the method of the present invention was applied to production of roll cakes, and it was found that excellent effects were similarly obtained. In the case of roll cakes, however, since batter is continuously baked and taken out of a baking oven, a force cannot be applied to the baked good according to the same method as adopted for sponge cakes. Further, the roll cake batter is very small in thickness and hence, the interior temperature is rapidly lowered in a very short time after withdrawal from the baking oven.

An embodiment of the force-applying device suitably used for production of roll cakes is illustrated in FIG. 8. A warming chamber 20 is disposed just adjacently to the baking oven 1, and the inside temperature of the chamber 20 is maintained at 70° to 100° C. A force is applied to the baked good in this chamber 20. The roll cake good 21 baked in the baking oven 1 is peeled from an endless steel band 23 at the outlet of the baking oven 1 by a separator 22 and transferred onto an endless steel band 24 disposed adjacently to the band 23 in the warming chamber 20. Then, the baked good is passed through the warming chamber 20. A rigid shock-imparting plate 25 is disposed just below the steel band 24 and suspended from a ceiling or frame (not shown) of the chamber 20 by supporting members 26. The plate 25 is generally spaced slightly from the steel band 24 by springs 27 expanded between the lower ends of the supporting members 26 and the plate 25. A hammer arm 28 is disposed below the shock-imparting plate 25 so that it is rotated at a given interval to beat the lower side of the plate 25 intermittently. When the plate 25 is beaten by the hammer arm 28, it is moved upwardly in the horizontal state against the springs 27 and is caused to adhere closely to the steel band 24 on which the baked good 21 is carried, whereby the beating shock imparted to the plate 25 is transferred to the baked roll good 21 through the steel band 24. Thus, the shock is imparted to the roll good in the warming chamber 20 in which the interior temperature of the baked roll good is maintained at a level lower than by at most 5° C. than the temperature at the time of completion of the baking step. The force applied to the baked roll good in the warming chamber 20 is hardly transferred to the roll good outside the chamber 20, especially the good being baked in the baking oven. The reason is that since the baked roll good per se is very soft, the force (the shock in this case) is readily absorbed in the good itself. The baked roll good coming from the warming chamber 20 is peeled from the steel band 24 by a separator 29 and transferred onto another steel band 30. Then, it is transported to a subsequent treatment step.

As is apparent from the foregoing embodiments, the critical feature of the present invention is that a force is applied to the entire of a baked good while the interior temperature of the baked good is still maintained at a level lower by at most 5° C. than the temperature at the time of completion of the baking step, to thereby prevent occurrence of the cave-in phenomenon. According to the present invention, occurrence of the cave-in phenomenon can be completely prevented in a very simple manner without modifying the quality of raw materials such as dough or batter or making drastical improvements on the conventional production technique.

What we claim is:

1. A method for preparing baked goods comprising the steps of: baking an article; applying an impact force transferred at least to the interior of said baked article, said force being applied for preventing cave-in on the surface of said article after completing said baking step; said force being applied when the interior temperature of the baked article is substantially up to 5° C lower than the interior temperature prevailing when baking of said article has been completed; said force applied to said article having a value equivalent to at least the impact force which would be applied to said article if it were to fall under gravity onto a rigid surface from a height of at least 3 centimeters, said impact force being applied by shock or vibration.

2. A method as defined in claim 1 wherein said force is applied by dropping said article under the influence of gravity onto a rigid surface.

3. A method as defined in claim 1 wherein said force is applied by sliding said article downward on a sloping surface, said article colliding with a rigid surface on said sloping surface.

4. A method as defined in claim 1 wherein said force is applied to said article by passing said article over an uneven path.

5. A method as defined in claim 1 wherein said force is applied to said article by striking said article.

6. Apparatus for preparing baked goods comprising: means for baking an article; a production line along which said article is passed during baking; means for applying an impact force transferred at least to the interior of said baked article, said means for applying an impact force being positioned with respect to the baking means and constructed so that said impact force is applied for preventing cave-in on the surface of said article after said article exits from the baking means and when the interior temperature of the baked article is substantially up to 5° C lower than the interior temperature prevailing when baking of said article has been completed and so that said impact force applied to said article has a value equivalent to at least the impact force which would be applied to said article if it were to fall under gravity onto a rigid surface from a height of at least 3 centimeters, and so that said impact force is applied by shock or vibration.

7. Apparatus as defined in claim 6 wherein said means for applying said force comprises means for holding said article for a substantially short time interval and then dropping said article under the influence of gravity; and a rigid member onto which said article falls after being dropped.

8. Apparatus as defined in claim 6 wherein said means for applying said force comprises means with a sloping surface on which said article is slidable; and reciprocal means adjacent to the lower end of said sloping surface for blocking the path of said article for a substantially short time interval when said article slides down on said sloping surface.

9. Apparatus as defined in claim 6 wherein said means for applying said force comprises means for striking said article instantly.

10. Apparatus as defined in claim 6 wherein said means for applying said force comprises a plurality of eccentric rollers, an endless belt loosely stretched on said eccentric rollers, a plurality of wheels arranged on both edges of said belt for applying predetermined tension thereto, and means for driving said belt, said wheels applying tension to form said belt into an uneven path for imparting a predetermined vibrational force to said article when being conveyed on said belt.

* * * * *